US008605976B2

(12) United States Patent
Diamant et al.

(10) Patent No.: US 8,605,976 B2
(45) Date of Patent: Dec. 10, 2013

(54) SYSTEM AND METHOD OF DETECTION OF OPTIMAL ANGIOGRAPHY FRAMES FOR QUANTITATIVE CORONARY ANALYSIS USING WAVELET-BASED MOTION ANALYSIS

(75) Inventors: Idit Diamant, Ra'anana (IL); Shai Dekel, Ramat Hasharon (IL)

(73) Assignee: General Electric Corporation, Schenectady, NY (US)

( * ) Notice: Subject to any disclaimer, the term of this patent is extended or adjusted under 35 U.S.C. 154(b) by 910 days.

(21) Appl. No.: 12/634,951

(22) Filed: Dec. 10, 2009

(65) Prior Publication Data

US 2011/0142288 A1     Jun. 16, 2011

(51) Int. Cl.
*G06K 9/36*          (2006.01)
(52) U.S. Cl.
USPC .......................................... 382/130; 382/132
(58) Field of Classification Search
USPC ................................ 382/130, 132
See application file for complete search history.

(56) References Cited

U.S. PATENT DOCUMENTS

| 5,533,085 | A | | 7/1996 | Sheehan et al. | |
|---|---|---|---|---|---|
| 6,611,627 | B1 | * | 8/2003 | LaRossa et al. | 382/240 |
| 6,813,335 | B2 | * | 11/2004 | Shinbata | 378/62 |
| 7,280,864 | B2 | * | 10/2007 | Jenkins | 600/428 |
| 7,587,074 | B2 | * | 9/2009 | Zarkh et al. | 382/128 |
| 7,697,974 | B2 | * | 4/2010 | Jenkins et al. | 600/428 |
| 8,077,953 | B2 | * | 12/2011 | Qu et al. | 382/130 |
| 8,204,289 | B2 | * | 6/2012 | Qu et al. | 382/130 |
| 2008/0281218 | A1 | | 11/2008 | Lei et al. | |

OTHER PUBLICATIONS

Chih-Yang Lin and Yu-Tai Ching, "Extraction of Coronary Arterial Tree Using Cine X-Ray Angiograms," Biomed Eng Appl Basis Comm, Jun. 2005; 17: 111-120.*
M. Arnese, et al., "Quantitative Angiographic Measurements of Isolated Left Anterior Descending Coronary Artery Stenosis,", JACC, 1995, vol. 25, No. 7, pp. 1486-1491.
K. Nieman, et al., "Non-invasive coronary angiography with multislice spiral computed tomography: impact of heart rate," Heart, 2002, vol. 88, pp. 470-474.

* cited by examiner

*Primary Examiner* — Allen C. Ho
(74) *Attorney, Agent, or Firm* — Hanley, Flight and Zimmerman, LLC

(57) ABSTRACT

A novel and useful system and method of detecting the best candidate frames for diagnosis out of a series of coronary angiograms frames. The mechanism analyzes the motion of the visible arteries in the sequence of angiogram frames to identify the local minimas of the differences between sequential frames. Wavelet transform coefficients are generated for each frame and used to quantify the differences between every two sequential frames to detect minimal differences (which correspond to minimal motion). The optimal end-systole and end-diastole frames are selected from these local minima frames.

24 Claims, 15 Drawing Sheets

US 8,605,976 B2

SYSTEM AND METHOD OF DETECTION OF OPTIMAL ANGIOGRAPHY FRAMES FOR QUANTITATIVE CORONARY ANALYSIS USING WAVELET-BASED MOTION ANALYSIS

FIELD OF THE DISCLOSURE

The subject matter disclosed herein relates to the field of digital imaging, and more particularly relates to a method and system for detection of optimal angiography frames for quantitative coronary analysis using wavelet based motion analysis.

BACKGROUND

Coronary angiography is a well known procedure involving x-ray examination of the blood vessels of the heart (i.e. the coronary arteries). A diagram illustrating a coronary angiography procedure is shown in FIG. 1. During this procedure, a catheter 12 is inserted into one of the two major coronary arteries in the body 10, and a radio-opaque contrast agent (i.e. dye) is injected into the blood stream to make the arteries in the heart 14 visible in x-ray images. The catheter is a long, thin, hollow tube introduced into the circulation and guided to the heart with X-rays. A coronary angiogram is a way of looking at the blood vessels of the heart (the coronary arteries) using this technique. Coronary angiography enables the radiologist or cardiologist to see any narrowing (i.e. stenosis) 16 of the blood vessels, which may inhibit the flow of blood and cause pain. It is performed for both diagnostic and interventional purposes.

It is desirable to have a mechanism that is able to automatically select one or more images from the angiography image set that are optimal for diagnosis and analysis by the cardiologist, radiologist technician or other medical personnel.

BRIEF DESCRIPTION OF THE DISCLOSURE

There is thus provided a method of determining optimal candidate frames for diagnosis from a sequence of coronary angiogram frames, the method comprising analyzing the motion of visible arteries in each frame, measuring the movement of arteries over time and identifying those frames exhibiting minimal movement and selecting optimal candidate frames for diagnosis therefrom.

There is also provided a method of detecting optimal end systole (ES) and end diastole (ED) frames for diagnosis from a sequence of coronary angiogram frames, the method comprising determining a subset of frames with sufficient visible arteries for consideration from the sequence of coronary angiogram frames, quantifying the movement of arteries over time by calculating the differences between pairs of sequential frames within the subset of frames, identifying local minima frames based on the calculated differences and selecting a pair of local minima frames for diagnosis corresponding to ES and ED frames of the same cardiac cycle.

There is further provided a method of detecting optimal end systole (ES) and end diastole (ED) frames for diagnosis from a sequence of coronary angiogram frames, the method comprising performing a wavelet transform on each frame within the sequence of angiogram frames and generating corresponding wavelet coefficients therefrom, calculating, for each frame within the sequence of angiogram frames, a sum of wavelet coefficients corresponding thereto, generating a subset of frames from the sequence whose corresponding wavelet coefficient sum exceeds a threshold, calculating the differences between pairs of sequential frames in the subset of frames and selecting, based on the calculated differences, optimal ES and ED frames for diagnosis corresponding to the lowest pair of local minima from among all cardiac cycles within the subset of frames.

There is also provided a computer program product characterized by that upon loading it into computer memory a process of detecting optimal end systole (ES) and end diastole (ED) frames for diagnosis from a sequence of coronary angiogram frames is executed, the computer program product comprising a computer usable medium having computer usable program code embodied therewith, the computer usable program code comprising computer usable code configured to determine a subset of frames with sufficient visible arteries for consideration from the sequence of coronary angiogram frames, computer usable code configured to quantify the movement of arteries over time by calculating the differences between pairs of sequential frames within the subset of frames, computer usable code configured to identify local minima frames based on the calculated differences and computer usable code configured to select a pair of local minima frames for diagnosis corresponding to ES and ED frames of the same cardiac cycle.

There is further provided a computer for use in performing quantitative coronary analysis (QCA) comprising a display, a memory, a processor coupled to execute instructions loaded into the memory, the instructions when executed on the processor operative to perform a wavelet transform on each frame within the sequence of angiogram frames and generate corresponding wavelet coefficients therefrom, calculate, for each frame within the sequence of angiogram frames, a sum of wavelet coefficients corresponding thereto, generate a subset of frames from the sequence whose corresponding wavelet coefficient sum exceeds a threshold, calculate the differences between pairs of sequential frames in the subset of frames and select, based on the calculated differences, optimal ES and ED frames for diagnosis corresponding to the lowest pair of local minima from among all cardiac cycles within the subset of frames.

BRIEF DESCRIPTION OF THE DRAWINGS

The invention is herein described, by way of example only, with reference to the accompanying drawings, wherein.

DETAILED DESCRIPTION OF THE DISCLOSURE

Notation Used Throughout

Figure 1:
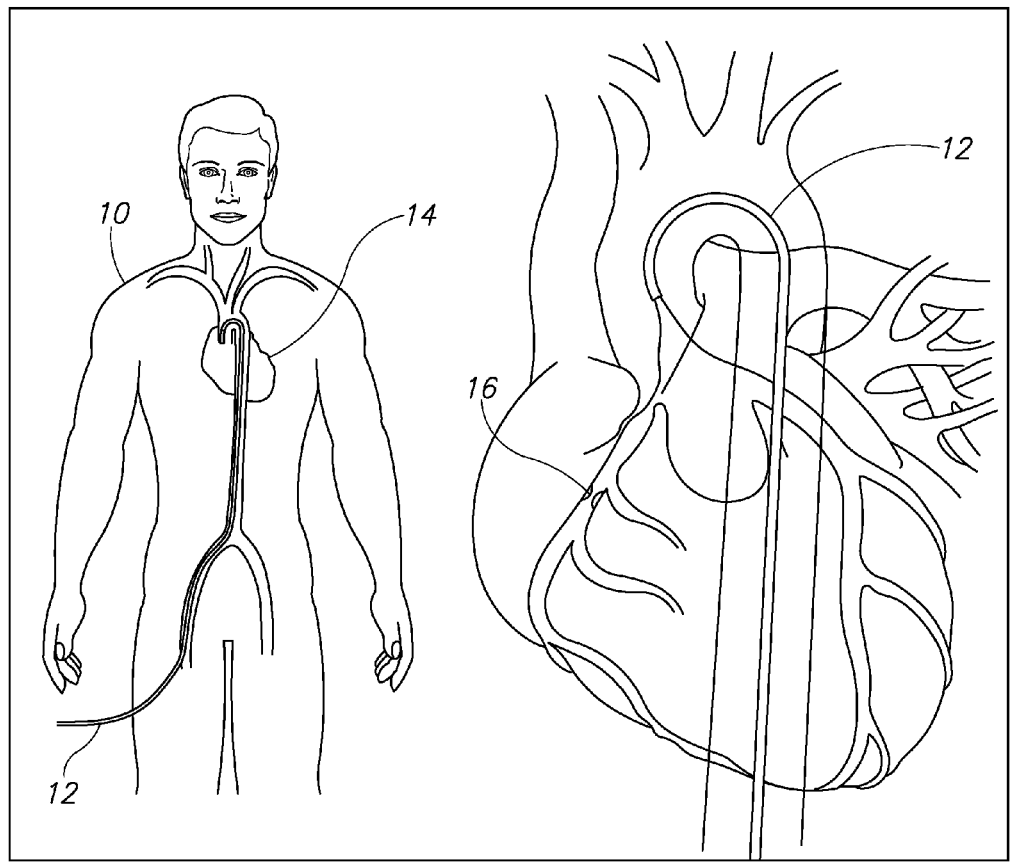
FIG. 1 is a diagram illustrating a coronary angiography procedure.

The following notation is used throughout this document:

| Term | Definition |
| --- | --- |
| ASIC | Application Specific Integrated Circuit |
| CDROM | Compact Disc Read Only Memory |
| CPU | Central Processing Unit |
| DAT | Digital Audio Tape |
| DSP | Digital Signal Processor |
| DVD | Digital Versatile Disk |
| DWT | Discrete Wavelet Transform |
| ECG | Electrocardiogram |
| ED | End-Diastole |
| EEROM | Electrically Erasable Read Only Memory |
| EPROM | Erasable Programmable Read-Only Memory |
| ES | End-Systole |
| FPGA | Field Programmable Gate Array |
| FTP | File Transfer Protocol |
| HPF | High Pass Filter |
| HTTP | Hyper-Text Transport Protocol |
| IOD | Information Object Definition |
| JPEG | Joint Photographic Experts Group |
| LAN | Local Area Network |
| LPF | Low Pass Filter |
| MAN | Metropolitan Area Network |
| NIC | Network Interface Card |
| OS | Operating System |
| PACS | Picture Archiving and Communication Systems |
| PAN | Personal Area Network |
| QCA | Quantitative Coronary Analysis |
| RAM | Random Access Memory |
| RF | Radio Frequency |
| ROI | Region of Interest |
| ROM | Read Only Memory |
| SAN | Storage Area Network |
| SRAM | Static Random Access Memory |
| WAN | Wide Area Network |
| WWAN | Wireless Wide Area Network |

DETAILED DESCRIPTION

A novel and useful system and method of detecting the best candidate frames for diagnosis out of a series of coronary angiograms frames. The mechanism analyzes the motion of the visible arteries in the sequence of angiogram frames to identify the local minimas of the differences between sequential frames. Wavelet transform coefficients are generated for each frame and used to quantify the differences between every two sequential frames to detect minimal differences (which correspond to minimal motion). The optimal end-systole and end-diastole frames are selected from these local minima frames.

Computer Processing System

As will be appreciated by one skilled in the art, the optimal frame detection mechanism may be embodied as a system, method, computer program product or any combination thereof. Accordingly, the mechanism may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the mechanism may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the mechanism. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Note that throughout this document, the terms processing, computing, calculating, determining, establishing, analyzing, checking, or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Figure 2:
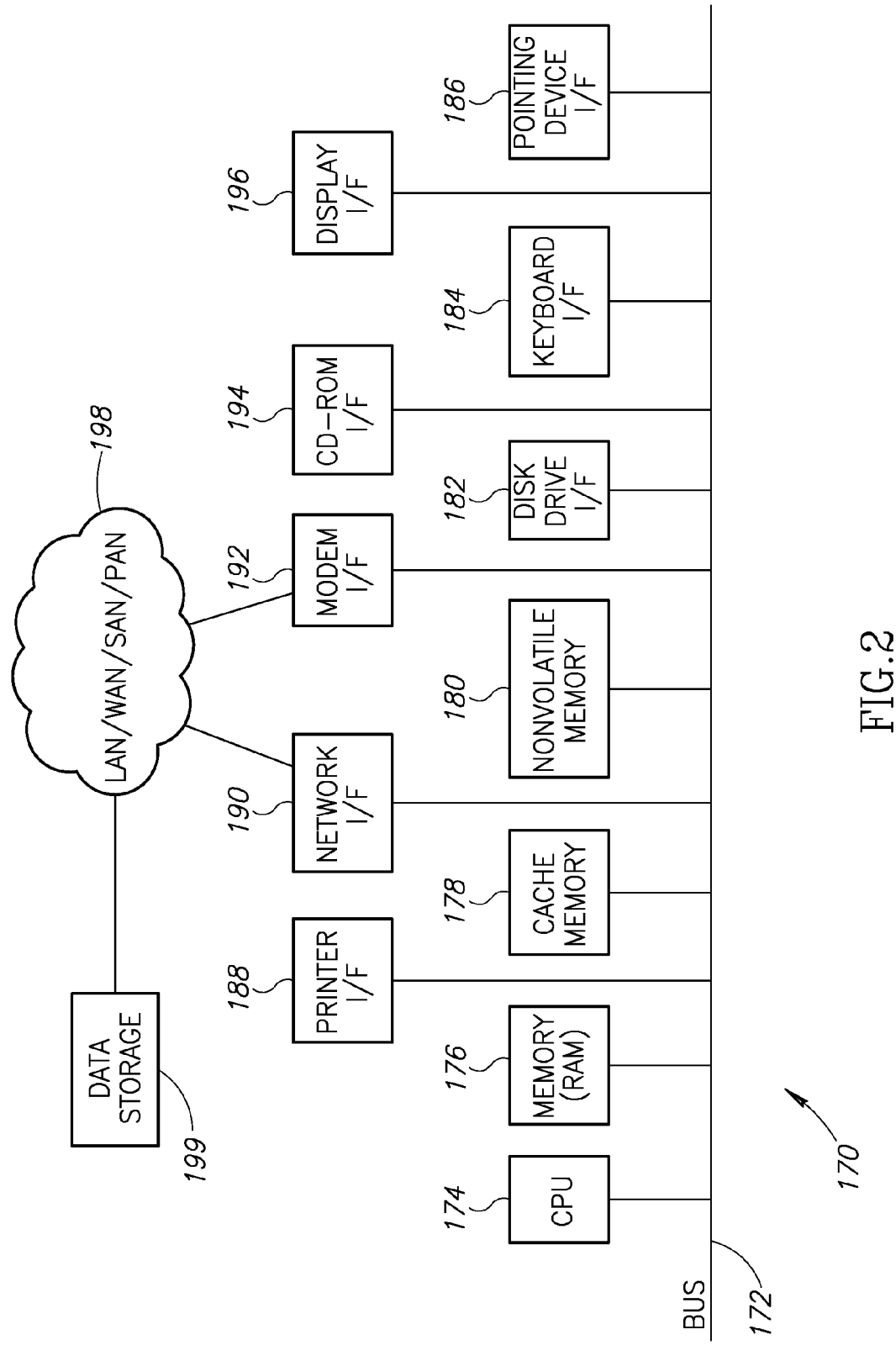
FIG. 2 is a block diagram illustrating an example computer processing system for implementing the optimal frame detection mechanism.

A block diagram illustrating an example computer processing system for implementing the optimal frame detection mechanism of the present invention is shown in FIG. 2. The computer system, generally referenced 170, comprises a processor 174 which may comprise a digital signal processor (DSP), central processing unit (CPU), microcontroller, microprocessor, microcomputer, ASIC or FPGA core. The computer, generally referenced 170, may be used as either a server or client computer. The computer further comprises non-persistent memory such as dynamic main memory 176 (e.g., RAM), fast cache memory 178 and persistent (i.e. non-volatile RAM or NVRAM) 180 which may comprise static read only memory (ROM) all in communication with the CPU via a bus 172. The CPU is also in communication via the bus with a number of peripheral devices that are also included in the computer system.

The device may be connected to external data storage 199 via network 198, e.g., LAN, WAN, MAN, PAN, Internet, etc. through network interface 190 (e.g., NIC) and/or modem interface 192. The network adapters 190 coupled to the system enable the data processing system to become coupled to other data processing systems or remote printers or storage devices through intervening private or public networks. Modems, cable modem and Ethernet cards are just a few of the currently available types of network adapters. The network interface comprises wired and/or wireless interfaces to one or more communication channels. The network interface is adapted to handle the particular wired or wireless network protocol being used, e.g., one of the varieties of copper or optical Ethernet, Token Ring, IEEE 802.3b, 802.3a, etc.

The processor is also in communication, via the bus, with a number of peripheral devices that are also included in the computer system. Peripheral devices include one or more magnetic storage devices for storing application programs and data via disk drive interface 182, keyboard interface 184, pointing device interface 186, display interface 196, CD-ROM interface 194 and printer interface 188. The keyboard, pointing device and display form the user interface for inputting and responding to user inputs and to provide feedback and other status information. Application programs and data may be stored in memory 176, cache 178, non-volatile memory 180, other semiconductor based storage and/or magnetic storage 199. The system comprises computer readable storage medium which may include any suitable memory means including but not limited to magnetic storage, optical storage, CD-ROM drive, ZIP drive, DVD drive, DAT cassette, semiconductor volatile or non-volatile memory or any other suitable memory storage device.

Software operative to implement the functionality of the optimal frame detection mechanism or any portion thereof is adapted to reside on a computer readable medium, such as a magnetic disk within a disk drive unit or any other volatile or nonvolatile memory.

Alternatively, the computer readable medium may comprise a floppy disk, removable hard disk, flash memory, EEROM based memory, bubble memory storage, ROM storage, distribution media, intermediate storage media, execution memory of a computer, and any other medium or device capable of storing for later reading by a computer a computer program implementing the mechanism. The software adapted to implement the optimal frame detection mechanism may also reside, in whole or in part, in the static or dynamic main memories or in firmware within the processor of the computer system (i.e. within microcontroller, microprocessor or microcomputer internal memory).

Other digital computer system configurations can also be employed to implement the optimal frame detection mechanism, and to the extent that a particular system configuration is capable of implementing the system and methods of this mechanism, it is equivalent to the representative digital computer system of FIG. 2 and within the spirit and scope of this mechanism.

Once they are programmed to perform particular functions pursuant to instructions from program software that implements the system and methods of this mechanism, such digital computer systems in effect become special purpose computers particular to the mechanism. The techniques necessary for this are well-known to those skilled in the art of computer systems.

Figure 3:
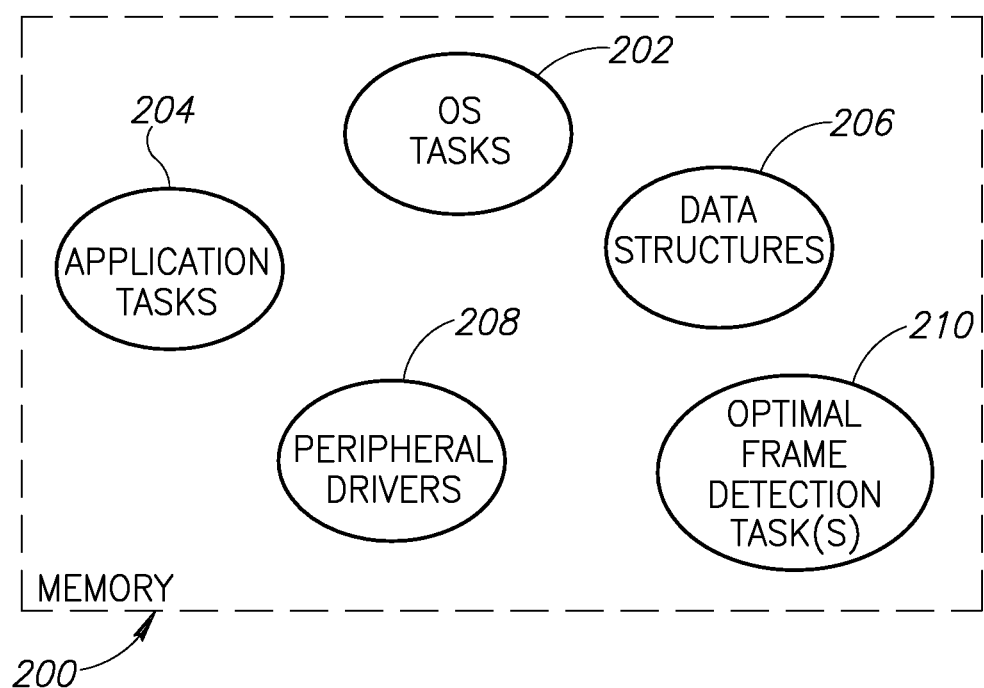
FIG. 3 is a block diagram illustrating the plurality of tasks adapted to execute on the computer of FIG. 2.

A block diagram illustrating the plurality of tasks adapted to execute on the computer of FIG. 2 is shown in FIG. 3. The memory, generally referenced 200, comprises a computer readable medium for the storage and execution of the software required to operate the computer and to implement the optimal frame diction mechanism. The tasks shown are only a portion of the tasks required for the operation of the computer. For illustration purposes only, tasks shown include the tasks making up the operating system (OS) 202, application software tasks 204, the data structures 206 used in executing the software, peripheral driver software 208 and the optimal frame detection related tasks 210 for either client, server or data processing computer.

It is noted that computer programs implementing the system and methods of this invention will commonly be distributed to users on a distribution medium such as floppy disk or CDROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Quantitative Coronary Analysis

Figure 4:
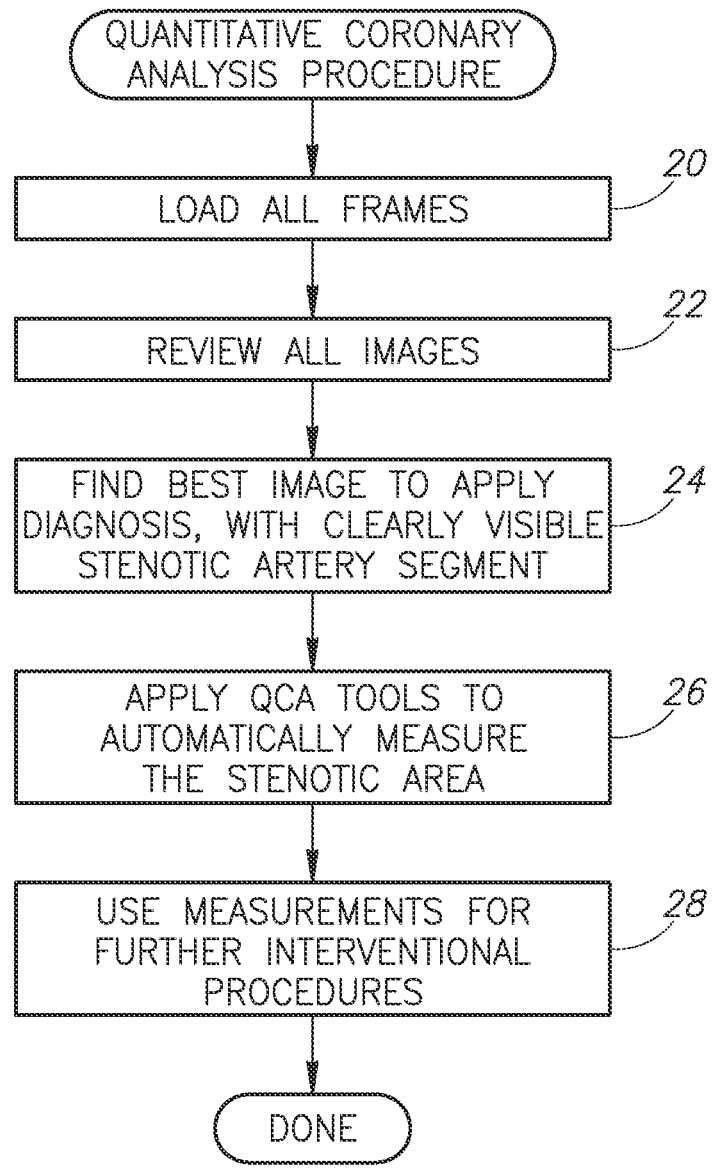
FIG. 4 is a flow diagram illustrating a typical quantitative coronary analysis procedure performed by a cardiologist or radiologist.

A common diagnostic procedure known as Quantitative Coronary Analysis (QCA) is performed using coronary angiography images (or frames) as input. The QCA procedure is used to quantify the severity of any stenosis. A flow diagram illustrating a typical quantitative coronary analysis procedure performed by a cardiologist or radiologist is shown in FIG. 4. First, all angiography frames are loaded into a computer capable of displaying the frames (step 20). The cardiologist (or other medical personnel) then manually reviews the displayed images (step 22). In order to perform QCA, the cardiologist manually searches for the optimal frame which clearly shows the stenotic area (step 24). After finding the desired frame, the physician launches the QCA software tools, which performs automatic measurements of the stenotic segment, such as occlusion percentage and artery area reduction, and displays the output to the user on the display (step 26). The measurements can then be used for further interventional procedures (step 28).

Figure 5:
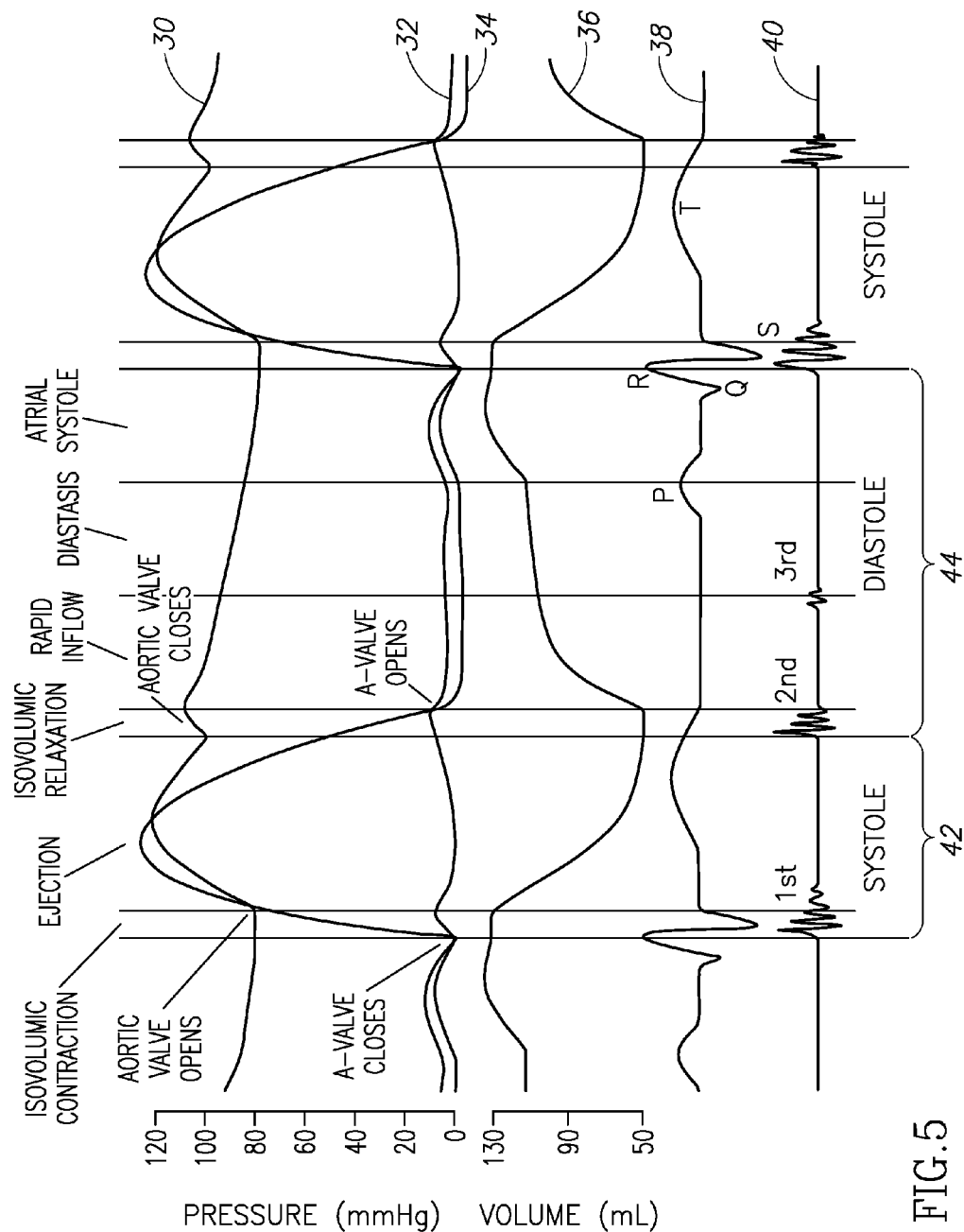
FIG. 5 is a diagram illustrating the cardiac events that occur over two cardiac cycles.

During coronary angiography, images are typically captured at 15-30 frames per second (depending on heart rate). In addition, about 3 to 8 cc of a radio-contrast agent is injected for each image to make the blood flow visible for about 3-5 seconds which enables the examination of several cardiac cycles. A diagram illustrating the cardiac events that occur over two cardiac cycles is shown in FIG. 5. Several timing traces through the two cardiac cycles are shown including: aortic pressure (trace 30), atrial pressure (trace 32), ventricular pressure (trace 34), ventricular volume (trace 36), electrocardiogram (trace 38) and phonocardiogram (trace 40). The cardiac cycle involves two stages: (1) cardiac systole 42 and (2) cardiac diastole 44. Cardiac systole (or ventricular systole) 42 is the period of time when contraction of the heart ventricles occurs and cardiac diastole 44 is the period of time when the muscles relax. At the end of the systole and diastole stages, referred to as end-diastole and end-systole, respectively, there is a short period of time when no change of volume occurs since the heart valves are closed at these times. It is at these points in time, therefore, that the motion of the heart and hence the motion of the coronary arteries is minimal.

QCA starts with the selection of an appropriate frame, which fulfills several important criteria. One of these criteria is that the arteries examined should be clearly visible, well filled with contrast medium and without overlap from other vessels. This can be achieved by considering the selection of an image from the second or third cardiac cycle after the contrast agent is injected. Further, to obtain images without vessel overlap it is preferable to select the images corresponding to the end-diastolic stage when the heart is relaxed and at its maximum volume. Another criterion is that in order to avoid motion blur, an image from the end-diastolic phase should be selected, where cardiac motion is minimal (i.e. minimum volume change). Minimal motion blur also occurs at the end-systolic stage where there is also minimal change in heart volume, as shown in FIG. 5. End-diastolic images are preferred for diagnosis, however, due to better separation of blood vessels during heart relaxation.

The first step of the QCA procedure, which includes reviewing all x-ray images searching for the most suitable frame to be analyzed, is time consuming. In order to accelerate the diagnostic analysis performed by a physician or radiology technician, an automated mechanism, which finds the best candidate frames for analysis is employed. Such a mechanism significantly shortens the time required for reviewing the angiography images and selecting best frames for diagnosis.

In one method of selecting end-diastolic (ED) and end-systolic (ES) frames from cine-angiogram images, an electrocardiogram (ECG) curve is used to find ED and ES frames. A disadvantage of this method is that it is not robust since complete synchronization between ECG signal and x-ray image acquisition is required. Otherwise incorrect results may be obtained.

In another method, optimal ES and ED frames are found using calculations of total edge length in a centered window. Local minima of edge length correspond to ED frames and local maxima to ES frames. A disadvantage is that calculations are performed for a centered window and not for the entire image. The results of the total edge length (and the location of local minima and maxima) depend heavily on the placement and size of the window. There are thus numerous opportunities for errors to be introduced in the calculations. The placement (and size) of the window can substantially influence the results and can lead to erroneous detection if not chosen properly. One of the factors that can cause difficulties in choosing the window position is the amount of visible arteries. Other factors that can lead to incorrect selection of ES and ED frames are, for example, the angle of view of the heart captured or the number of vessels that overlaps at systolic frames compared with diastolic frames. The results of this method depend strongly on the selected region of interest (ROI), which if chosen incorrectly can lead to erroneous results.

The optimal frame detection mechanism presented hereinbelow does not depend on a centered window or ECG curves. The mechanism is operative to automatically select optimal end-diastolic and end-systolic frames using wavelet transform calculations on the angiography frames.

Optimal Candidate Frame Detection

In the optimal frame detection mechanism, the best candidate frames for diagnosis out of a series of coronary angiograms frames is automatically detected. The mechanism takes advantage of the observation that (1) end-systolic (ES) and end-diastolic (ED) frames are the best frames to be used in the diagnostic procedure, and that (2) these frames appear at times when the motion of the heart is minimal. During the cardiac cycle, there are two short periods of time (i.e. at ES and ED) where the volume of the heart does not change (referred to as isovolumetric phase), and therefore the motion in the coronary arteries is at a minimum. The optimal frame detection mechanism is operative to analyze the motion of the visible arteries in the sequence of angiogram frames to identify the local minimas of the differences between sequential frames. These local minima frames correspond to ES and ED frames.

In one example embodiment, the mechanism utilizes the well-known Haar wavelet transform (described in more detail infra) to obtain wavelet coefficients of resolution two. The wavelet coefficients are then used to quantify the differences between every two sequential frames to detect minimal differences (which correspond to minimal motion). Once the local minimum frames are identified within the range of frames having visible arteries, the ES and ED frames having minimal motion and maximal visibility of arteries are selected to be displayed from among all candidate frames. The mechanism will now be described in more detail.

The well-known wavelet transform is an oscillating function, which is localized in time or space, and used to divide a given function into different scale components. A wavelet transform is the representation of a function by wavelets. It provides a time-frequency representation of a signal, as it captures both frequency and location information at different resolutions. A wavelet transform decomposes signals over dilated and translated wavelets. A wavelet $\psi$ is a function of zero average and expressed as $$\int_{-\infty}^{\infty} \psi(t) dt = 0 \qquad (1)$$

Scaling $\psi$ with s and translating by u, yields the following $$\psi_{u,s}(t) = \frac{1}{\sqrt{s}} \psi\left(\frac{t-u}{s}\right) \qquad (2)$$

The wavelet transform correlates f with $\psi_{u,s}$ and by applying Fourier Parseval formula it can also be written as a frequency integration as follows $$Wf(u,s) = \int_{-\infty}^{\infty} f(t) \frac{1}{\sqrt{s}} \psi^*\left(\frac{t-u}{s}\right) dt = \frac{1}{2\pi} \int_{-\infty}^{\infty} \hat{f}(\omega) \frac{1}{\sqrt{s}} \hat{\psi}^*\left(\frac{\omega-u}{s}\right) dt \qquad (3)$$

Thus, the wavelet coefficients depend on f(t) and $\hat{f}(w)$ values where the energy of the wavelet is concentrated. In images, large wavelet coefficients indicate the position of edges, which correspond to sharp variations of the image intensity. The wavelet transform also has multi-scale zooming, which enables detection of transients across scales. The approximation of f at different resolutions is computed using the scaling function $\phi$, which represents the impulse response of a low pass filter. An example of a wavelet function is the Haar function, a piecewise constant function which is defined as $$\psi(t) = \begin{cases} 1 & 0 \le t \le 1/2 \\ -1 & 1/2 \le t \le 1 \\ 0 & \text{otherwise} \end{cases} \qquad (4)$$

and its scaling function is $\phi = 1_{[0,1]}$.

The well-known discrete wavelet transform (DWT) is a wavelet transform for which the wavelets are discretely sampled. The DWT of an input digital signal is obtained using digital filtering techniques. The input image data is passed through low pass and high pass filters by applying a convolution of the input data with the digital filter. The filtered output sequence of a one-dimensional filter is defined as follows $$\hat{f}(n) = \sum_{k=-N}^{N} h(k) f(n-k) \qquad (5)$$

where f is the image data input, h(k) are the filter coefficients and N is the filter length.

Applying a low pass filter to the input image results in a smoother image (approximation coefficients), while applying a high pass filter results in detail coefficients which describe the local changes in the image, i.e. the edges of the image.

Figures 8A, 8B:
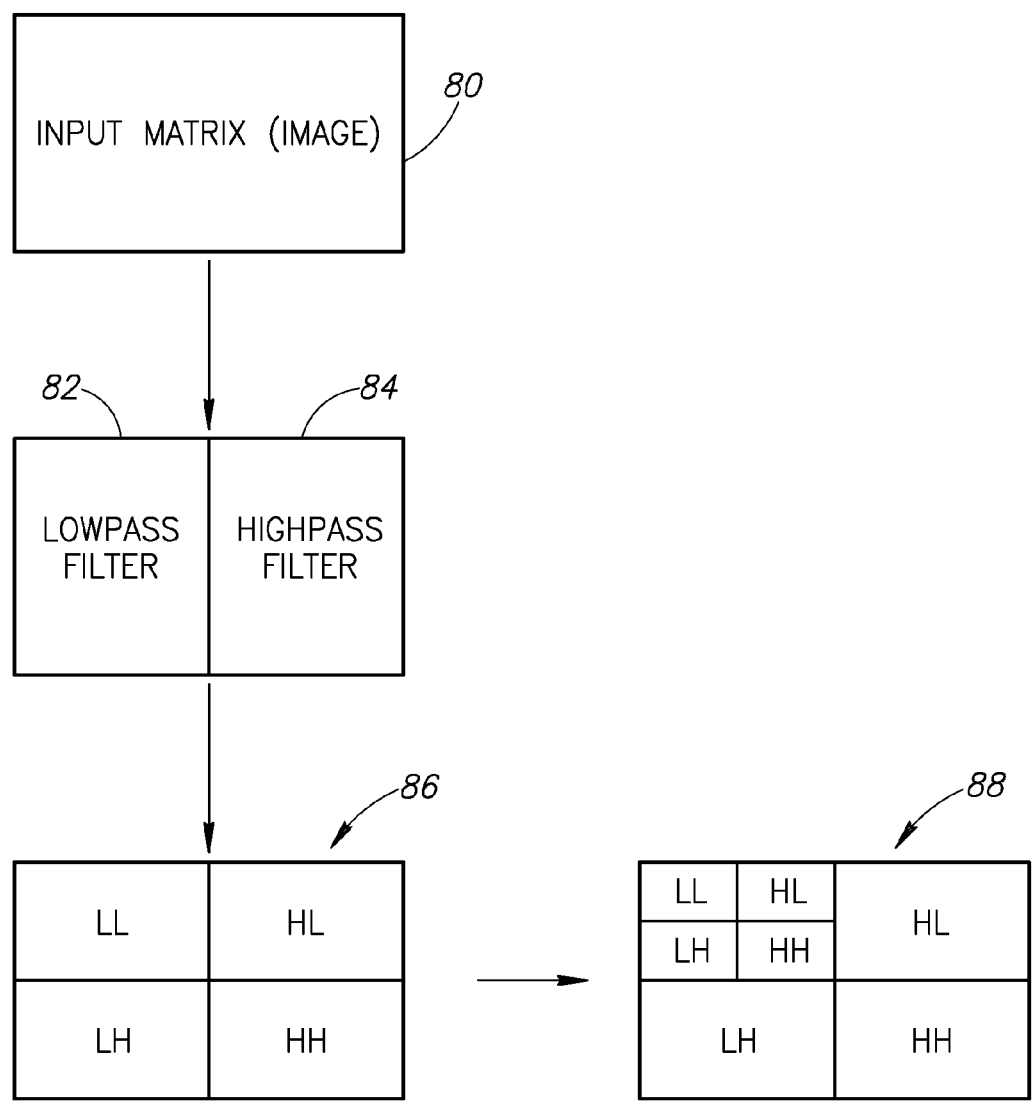
FIG. 8A is a diagram illustrating the 2D discrete wavelet transform performed on the input image.
FIG. 8B is a diagram illustrating the discrete wavelet transform applied on the lower resolution image output.

A diagram illustrating the 2D discrete wavelet transform performed on the input image is shown in FIG. 8A. A diagram illustrating the discrete wavelet transform applied on the lower resolution image output is shown in FIG. 8B. The DWT, which is based on sub-band coding, yields a fast computation of wavelet transform. Applying one step of the wavelet transform (low pass filter (LPF) 82 and high pass filter (HPF) 84) on an input image 80 results in four sub-bands 86, each corresponding to one filter combination applied in the x and y directions. For example, the Haar wavelet transform applies the low pass filter ($1/\sqrt{2}, 1/\sqrt{2}$) and the high pass filter ($1/\sqrt{2}, -1/\sqrt{2}$).

The LPF (i.e. 1D transform) is applied to the input image (i.e. 2D input matrix) in the x-direction to yield low pass intermediary results. The HPF (i.e. 1D transform) is applied to the input image in the x-direction to yield high pass intermediary results. The LPF and HPF are then applied to the low pass intermediary results in the y-direction to yield the LL and LH sub-band coefficients, respectively. The LPF and HPF are then applied to the high pass intermediary results in the y-direction to yield the HL and HH sub-band coefficients, respectively.

The three sub-bands HL, LH and HH contain the wavelet coefficients, which describe the horizontal edges (LH sub-band coefficients), vertical edges (HL sub-band coefficients) and diagonal edges (HH sub-band coefficients). A wavelet transform step is then applied again on the resultant LL sub-band, resulting in three sub-bands HL, LH and HH 88.

Figure 6:
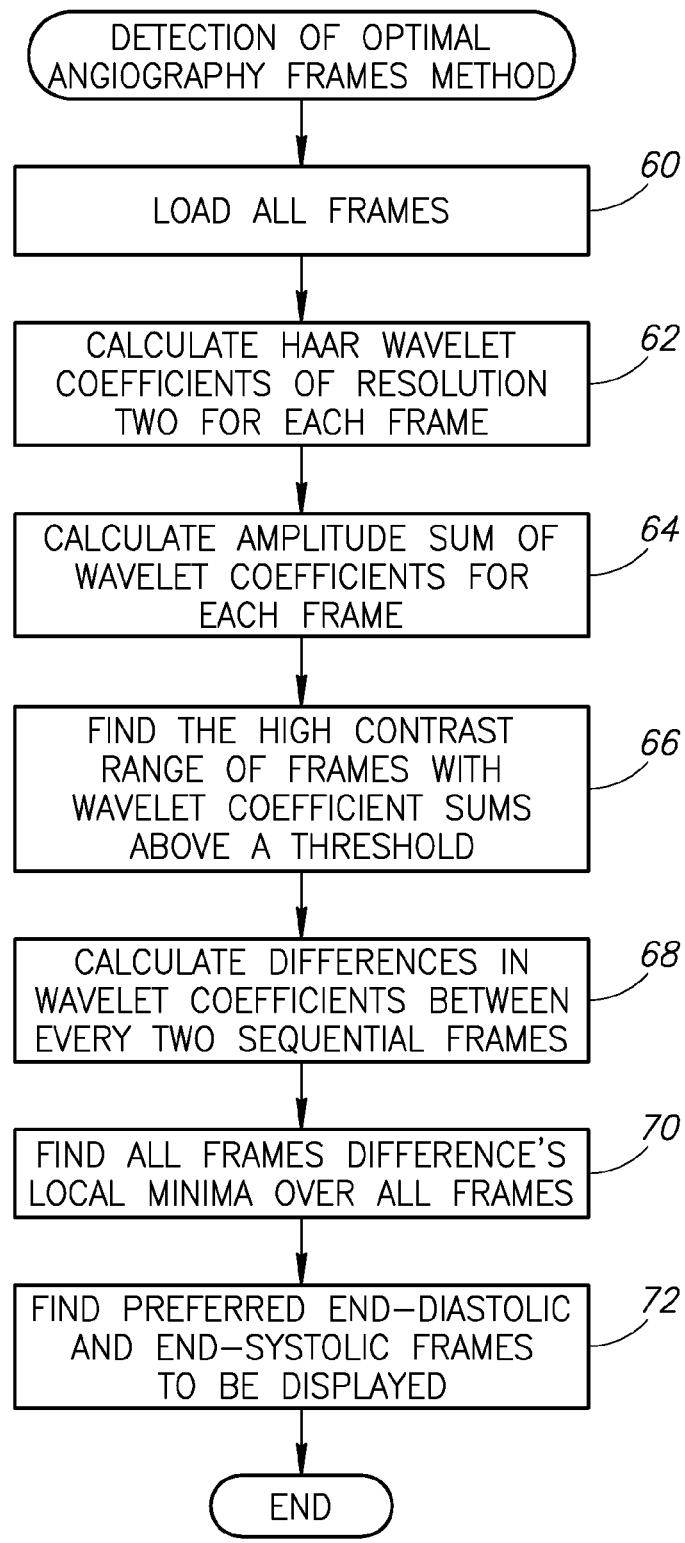
FIG. 6 is a flow diagram illustrating an example method of optimal frame detection.

A flow diagram illustrating an example method of optimal frame detection is shown in FIG. 6. First, the range of frames within the sequence of angiogram images having visible arteries must be identified. Visible arteries are detected as areas of high contrast (high contrast edges) which are created by the injection of a radio-contrast media into the patient during the image generation procedure. The high contrast edge content of each image is measured, in one embodiment, by applying a wavelet transform on the images. Those images with the highest contrast edges are deemed to have the most visible arteries.

After the sequence of angiogram images is loaded into memory (step 60), the Haar wavelet transform coefficients of resolution 2 are calculated for each frame in the sequence (step 62). The amplitude sum α of the wavelet coefficients for each frame are then calculated using the following expression (step 64).

$$\alpha_z = \sqrt{\sum_{i,j} \gamma_{i,j}^2} \quad (6)$$

where α is the wavelet coefficient sum, z is the frame index, γ is a wavelet coefficient, and indices i, j run over all coefficients in all three sub-bands (i.e. HL, LH and HH). The expression for α thus quantifies the amount of contrast agent present in each frame, i.e. the degree of visible arteries present. A higher value for α represents a larger number of visible arteries (i.e. more contrast agent detected due to larger number of edges). Conversely, a lower value for α represents a smaller number of visible arteries (i.e. less contrast agent detected due to smaller number of edges). Note that optionally, only wavelet coefficients γ with an absolute value larger than a particular threshold can be considered in order to reduce noise.

Figure 9:
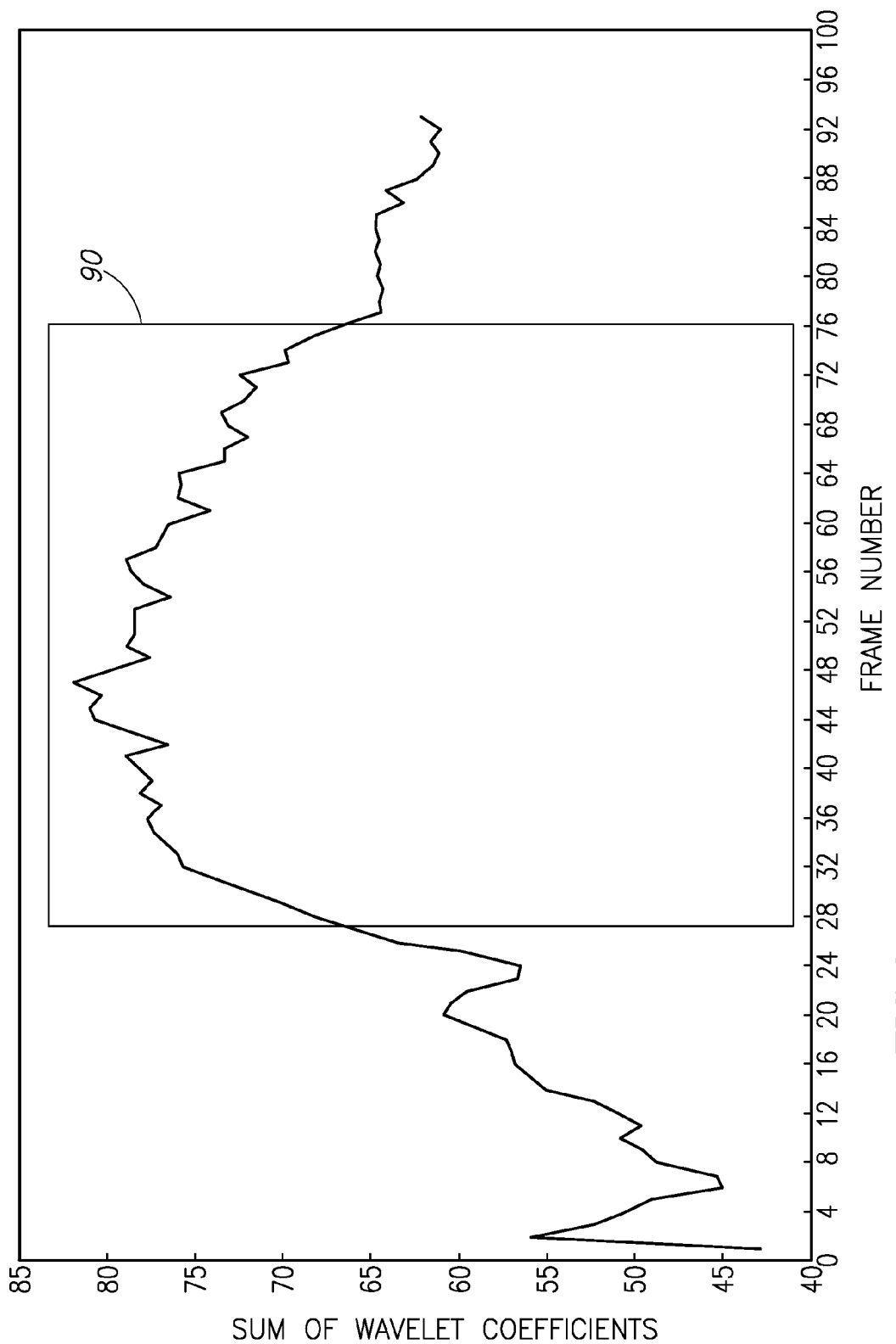
FIG. 9 is a graph of the sum of wavelet coefficients for each frame in a first example cine-angiogram.
Figure 12:
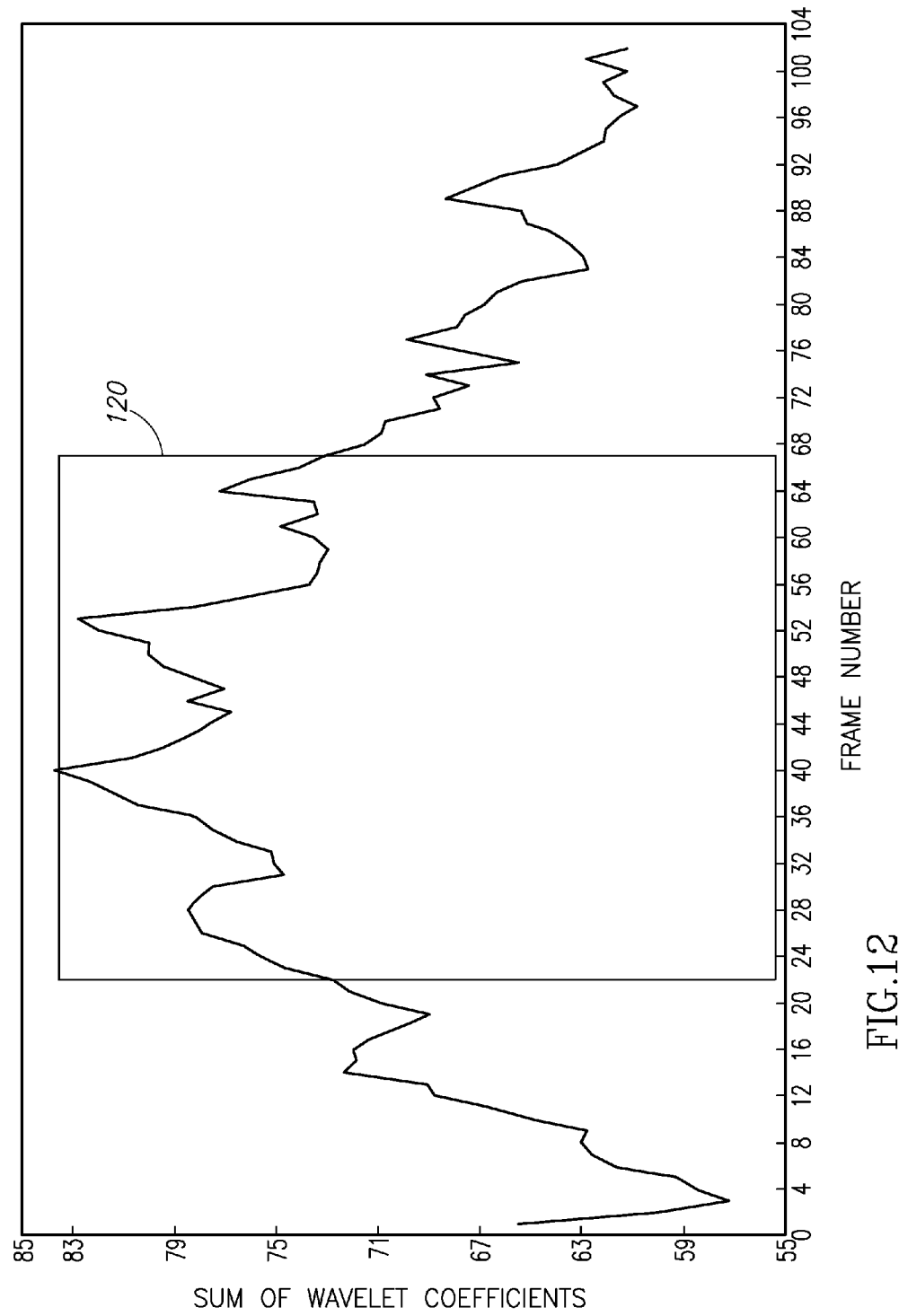
FIG. 12 is a graph of the sum of wavelet coefficients for each frame in a second example cine-angiogram.

A graph of the α value calculations (i.e. sum of wavelet coefficients) for each frame in a first example cine-angiogram is shown in FIG. 9. A graph of the α value calculations for each frame in a second example cine-angiogram is show in FIG. 12. In order to set the range of frames having a sufficient amount of visible arteries for applying the optimal frame detection procedure, the middle section of each plot, i.e. the area between the ascending and descending sections, is selected. The range of frames selected corresponds to frames having a α value above a certain threshold $t_\alpha$. In the example embodiment presented herein, this threshold $t_\alpha$ was set to 60% of the range of values (i.e. minimum to maximum). Note that the threshold can be set to other values depending on the particular implantation and is not limited to the example described herein. The threshold $t_\alpha$ is calculated using the following expression as follows $$t_\alpha = 0.6*(\text{max } \alpha \text{ value} - \text{min } \alpha \text{ value}) + \text{min } \alpha \text{ value} \quad (7)$$

This thresholding expression is applied to the α values for all frames of the original angiogram image sequence to generate a sub-set of candidate frames to which the search for the optimal frames for diagnosis is applied to (step 66). The results of this thresholding step are shown as box 90 in FIG. 9 which includes frames 27 through 76; and as box 120 in FIG. 12 which includes frames 22 through 67.

The motion of the arteries is then quantified by calculating the difference between every pair of sequential frames using the following equation (step 68)

$$\beta_z = \sqrt{\sum_{i,j} 0.5*(\gamma_{i,j,z+1} - \gamma_{i,j,z})^2} \quad (8)$$

where β represents the difference and $\gamma_{i,j,z}$ represents the wavelet coefficients of all three subbands for the $z^{th}$ frame. This equation sums up the differences between the coefficients of all pixels in two sequential frames for all three sub-bands. The result β is a quantity that effectively measures the motion of the arteries over time. In order to take into account the amount of edges which appear in the frame, the parameter β/α is used rather than β. The parameter β/α is preferred since it is considered a better indicator of the motion of the vessels due to the fact that it measures the difference in relation to the amount of edges. Additionally, β/α parameters also reflect the visibility of the edges, such that lower values correspond to lower motion and higher visibility.

Figure 10:
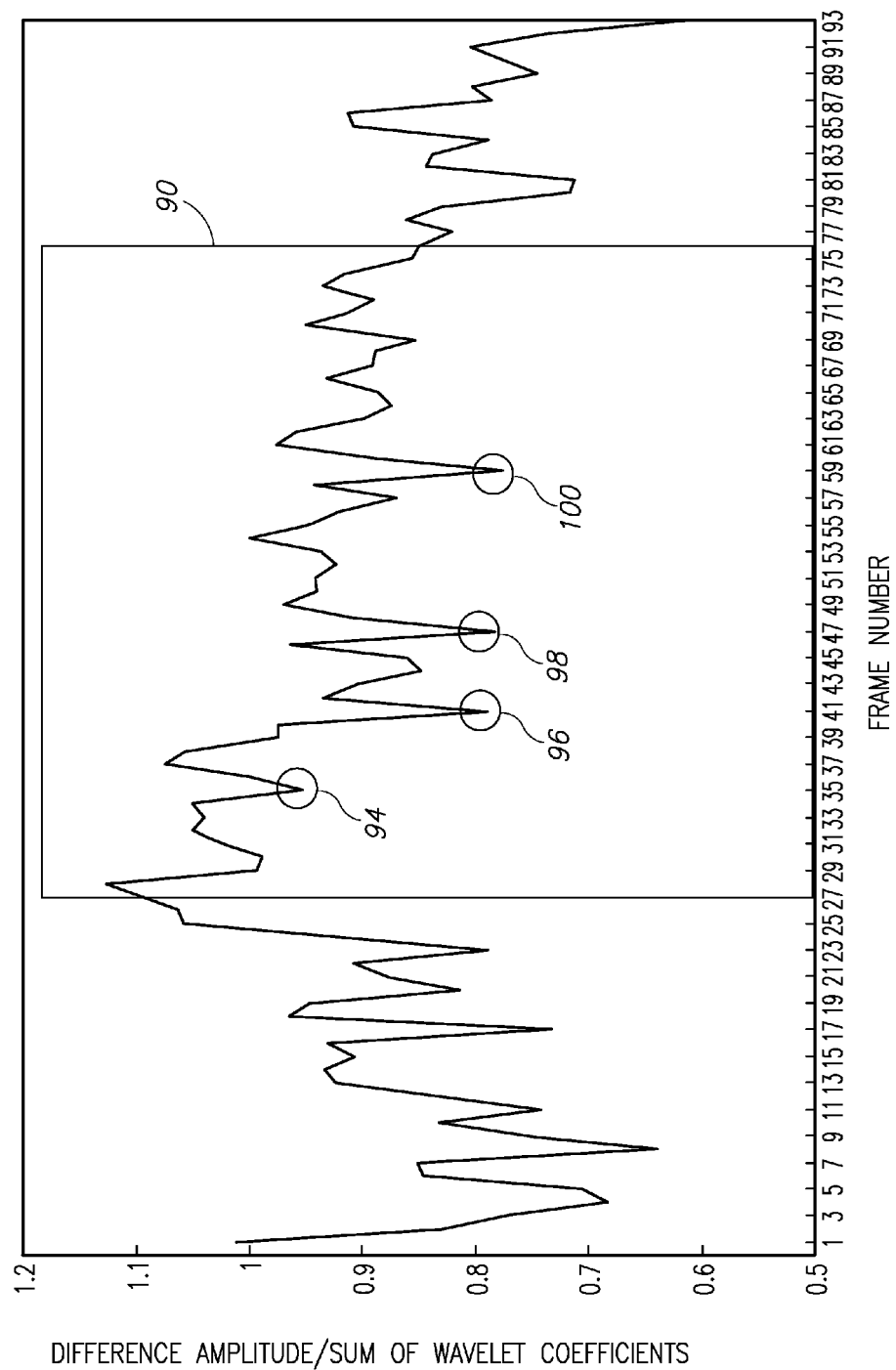
FIG. 10 is a graph of the amplitude of motion estimation between sequential frames of the first example cine-angiogram, showing examples of local motion minima pairs eliminated by the optimal frame detection mechanism.
Figure 13:
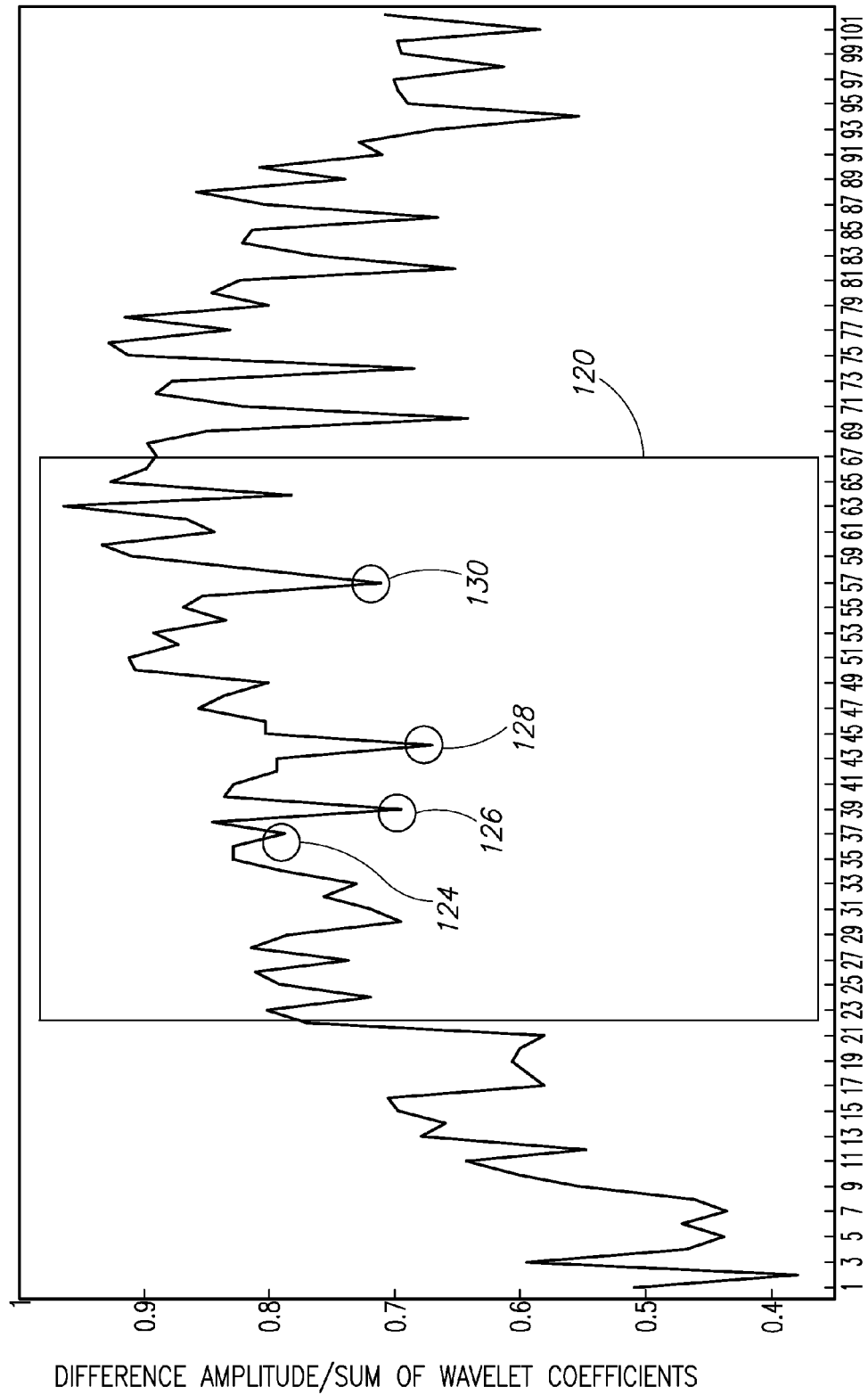
FIG. 13 is a graph of the amplitude of motion estimation between sequential frames of the second example cine-angiogram, showing examples of local motion minima pairs eliminated by the optimal frame detection mechanism.

A graph of the amplitude of the differences between sequential frames of the first example cine-angiogram is shown in FIG. 10. A graph of the amplitude of the differences between sequential frames of the second example cine-angiogram is shown in FIG. 13. Each of these graphs plot β/α value calculations over time for two different patients.

After calculating the differences of all pairs of sequential frames within the sub-set of candidate frames, the local minima over these frames are then found (step 70). Preferred ES and ED frames to be displayed (or processed further) are then selected from the local minima frames found (step 72).

Figure 7:
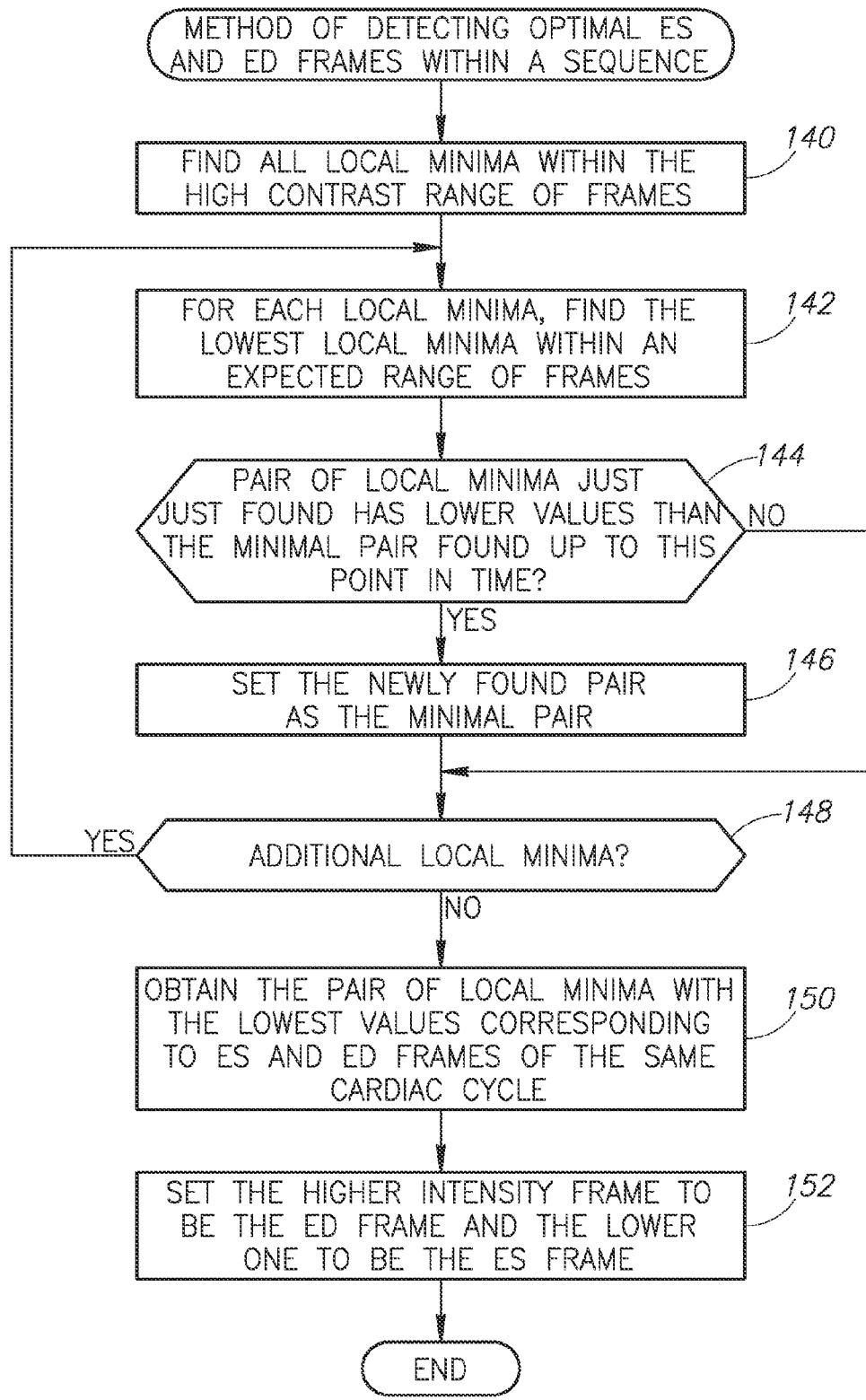
FIG. 7 is a flow diagram illustrating an example method of detecting optimal ES and ED frames.

The method of identifying optimal end-systolic and end-diastolic frames will now be described in more detail. A flow diagram illustrating an example method of detecting optimal ES and ED frames is shown in FIG. 7. The goal of this method is to find a neighboring pair of local minima (i.e. within the same cardiac cycle) with the lowest value (for β/α value) over all frames that are within the sub-set of candidate frames (i.e. inside the high contrast range which have been found to have a sufficient amount of visible vessels). The pair of local minima frames found should correspond to ES and ED time points having a minimum of motion and maximum arteries visibility compared to all frames. The pair of local minima, which is searched by the algorithm described herein (to have minimal motion among all local minima), must be close enough to belong to the same cardiac cycle and correspond to sequential ES and ED frames. Therefore, pairs of frames are searched over a range defined by a cardiac cycle period minus two frames (to avoid finding two ES or two ED frames rather than one ES frame and one ED frame).

The amount of frames in a cardiac cycle can be calculated using the frames per second (fps) value in which the x-ray angiogram (XA) was acquired. Typically, this information is stored in the DICOM file. The frames per second value is multiplied by the cardiac cycle period of time (in seconds) to yield the number of frames in a cardiac cycle. Calculating the length of a cardiac cycle can be based on the fact that a cardiac cycle is approximately 0.85 seconds long. The cardiac cycle length can also be determined using ECG data that is stored in the DICOM file as well. Further, the cardiac cycle period can be calculated depending on the known relationship between the frames per second value, for which the cine was acquired, and the heart rate of the patient, for each modality.

To find the optimal ES and ED frames, first find all local minima (for the β/α results) within the high contrast range (i.e. subset of candidate frames) (step 140). Then, for each local minimum, find the lowest local minimum within the expected range of frames (i.e. one cardiac cycle minus two frames) (step 142). If the pair of local minima just found (comprising the current local minimum frame and the lowest local minimum frame found within the expected range) has lower values than the minimal pair found until now (step 144), update the current found pair of local minimum frames as the new minimal pair (step 146).

After the loop terminates (step 148), the result is the pair of local minima frames having the lowest values which correspond to end-systole and end-diastole frames of the same cardiac cycle (step 150). The higher intensity frame from among the minimal pair found is set to ED frame and the lower intensity frame is set to the ES frame (step 152).

Figure 11:
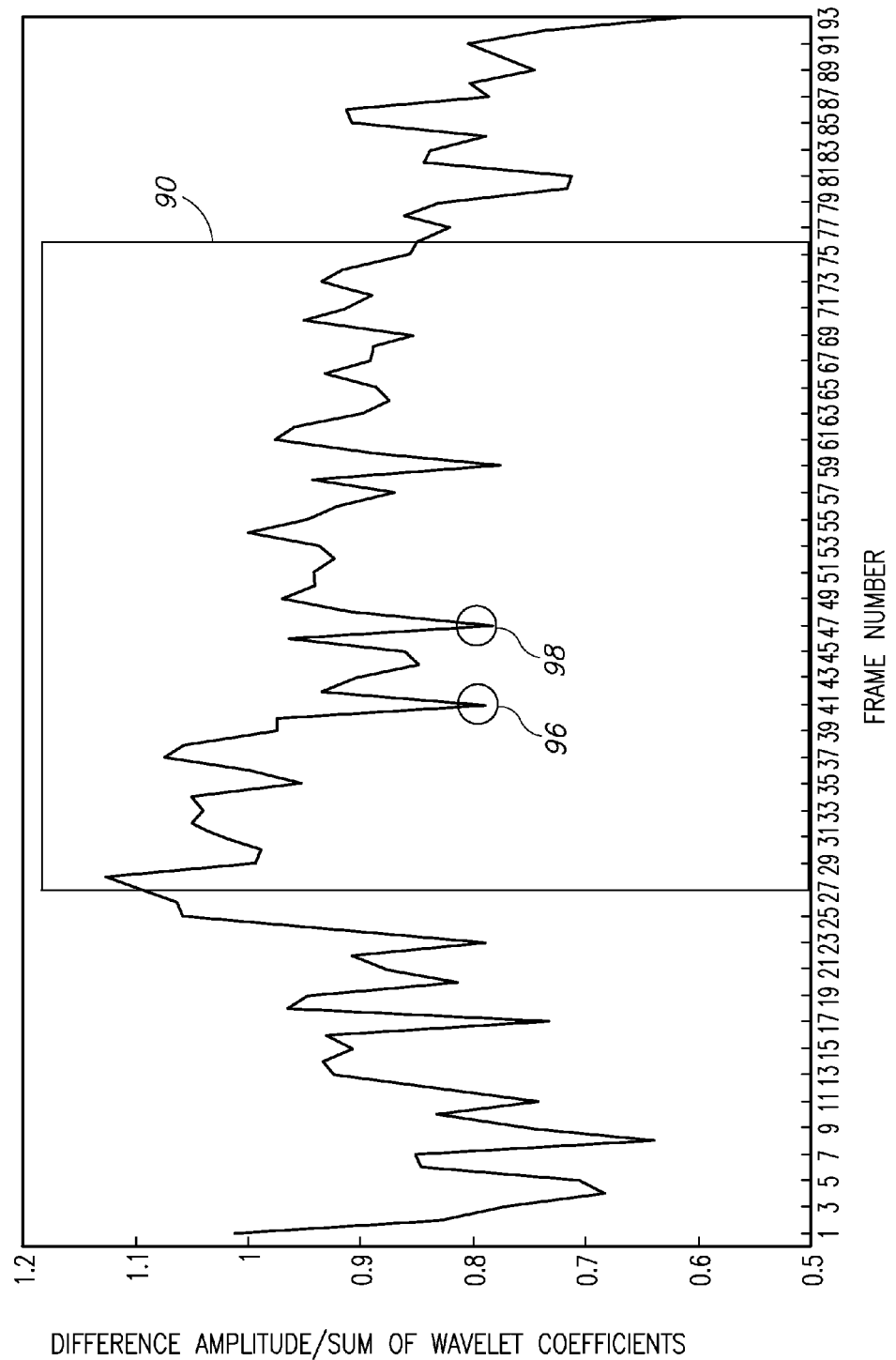
FIG. 11 is a graph of the local minima of FIG. 10 selected by the optimal frame detection mechanism.

Referring to FIG. 10, which illustrates the results of the method of FIG. 7 applied to a first sample cine-angiogram, the results of the calculation of the differences between sequential frames of candidate frames (i.e. frames within box 90) include local minima 94, 96, 98, 100. Note that pair 94 and 96 is eliminated due to the existence of other pairs having lower local minima. Pair 98 and 100 is eliminated as well due to the large distance between them (i.e. not in the same cardiac cycle). A graph of the local minima of FIG. 10 selected by the optimal frame detection mechanism is shown in FIG. 11. Local minima 96 and 98 are selected as the minimal local minima pair which are compatible to (i.e. correspond to) real ES and ED frames identified by observation.

Figure 14:
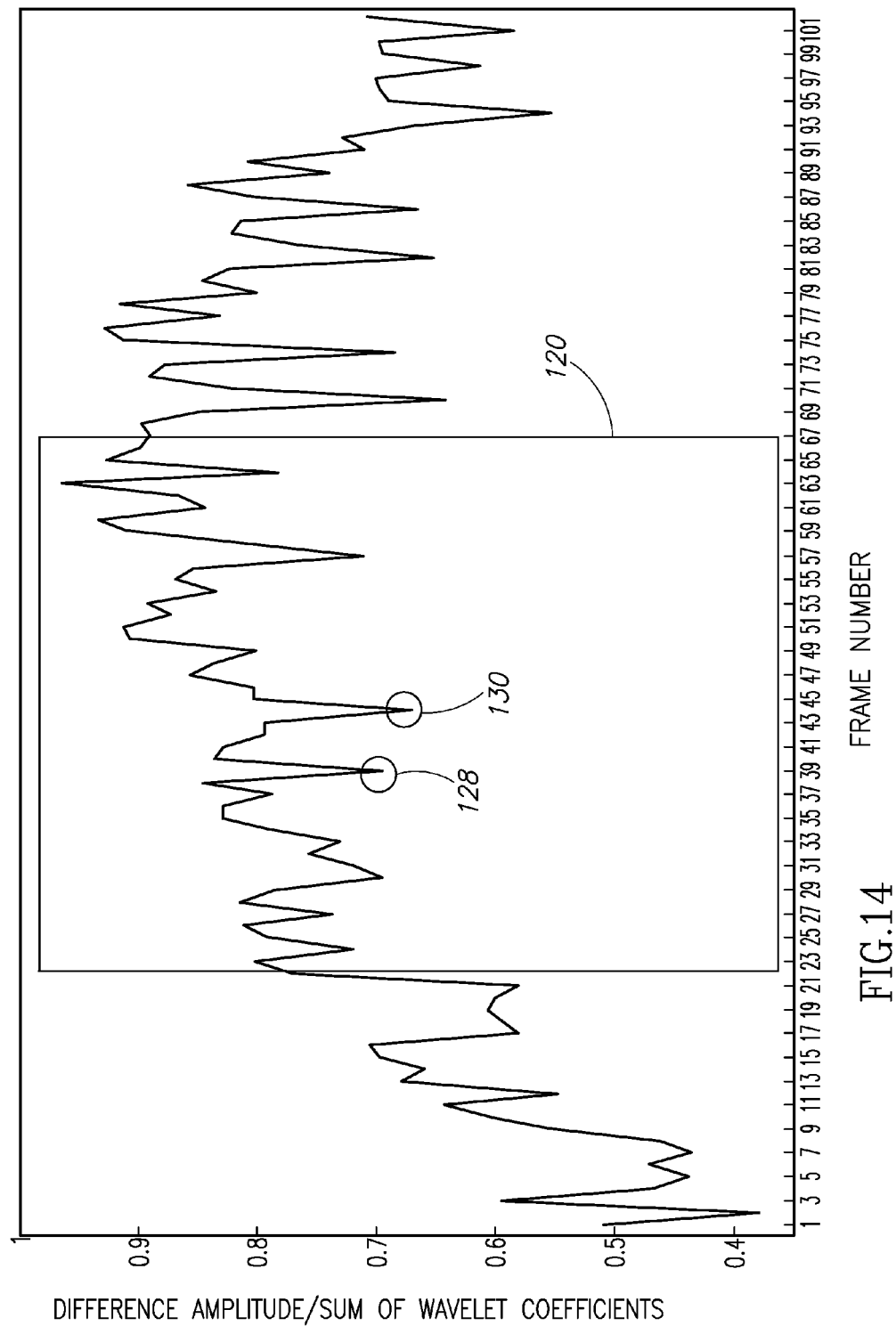
FIG. 14 is a graph of the local minima of FIG. 13 selected by the optimal frame detection mechanism.

Referring to FIG. 13, which illustrates the results of the method of FIG. 7 applied to a second sample cine-angiogram, the results of the calculation of the differences between sequential frames of candidate frames (i.e. frames within box 120) include local minima 124, 126, 128, 130. Note that pair 124 and 126 is eliminated due to the existence of other pairs having lower local minima. Pair 128 and 130 is eliminated as well due to the large distance between them (i.e. not in the same cardiac cycle). A graph of the local minima of FIG. 13 selected by the optimal frame detection mechanism is shown in FIG. 14. Local minima 126 and 128 are selected as the minimal local minima pair which are compatible to (i.e. correspond to) real ES and ED frames identified by observation.

Note that observing these two sample cine-angiograms, the pairs of frames 96, 98 and 126, 128 were found to be the end-systolic and end-diastolic frames of the second cardiac cycle after injection of the contrast agent. These frames are the optimal frames for diagnostic procedure purposes due to the good visibility of blood vessels in these image frames.

Detection of Optimal Frames from a Plurality of Angiogram Sequences

It is noted that coronary angiography is usually acquired in several angles in order to find the best angle from which the stenosis can be clearly seen and QCA can be applied. Therefore, in each examination several sequences of cine-angiograms are typically obtained. In an alternative embodiment, the methods presented supra can be applied to a plurality of sequences of angiogram images wherein the best ES and ED frames from among all sequences are selected.

Figure 15:
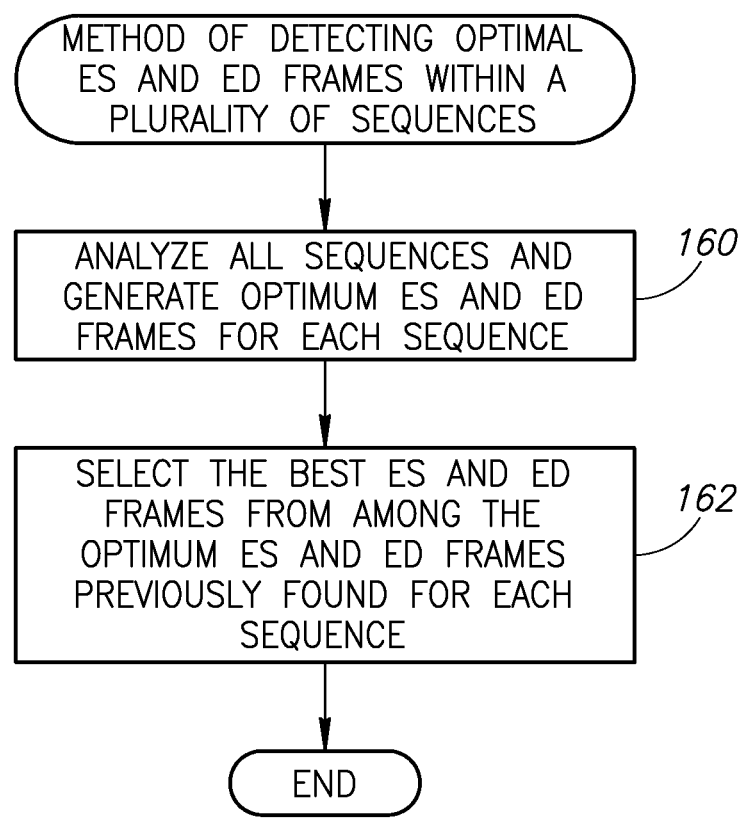
FIG. 15 is a flow diagram illustrating the method of detecting optimal frames within multiple angiography sequences.

A flow diagram illustrating the method of detecting optimal frames within multiple angiography sequences is shown in FIG. 15. All sequences within the plurality of sequences of angiogram images are analyzed and the optimum ES and ED frames for each sequence are determined (step 160). The sequences are analyzed by applying the methods of FIGS. 6 and 7 to each sequence separately. The result of this step is an optimal ES and ED frame pair for each sequence. Then, from among these results, the overall optimal ES and ED frame pair is selected (step 162).

Searching for and identifying the best ES and ED frames out of all sequences and not only within a single sequence, is advantageous to save significant searching time for the cardiologist or other medical personnel.

Automatic Visualization of Best Frames

In another alternative embodiment, the optimal frame detection mechanism is used to find the best ES and ED frames to use for applying a diagnostic procedure, as described supra. The best ES and ED frame pair is loaded immediately upon the user (or other entity) opening the x-ray angiogram for examination (i.e. for viewing and possible further processing). This can be achieved, for example, using a so called hanging protocol. This greatly accelerates the analysis procedure performed by the physician or technician.

A hanging protocol is defined as a series of actions performed to arrange images for optimal viewing. The term originally referred to the arrangement of physical films on a light box or the 'hanging' of films on a film alternator. Today, the term also refers to the concept of displaying softcopy images on a PACS or other type of workstation. In either application, the goal of the hanging protocol is to present specific types of studies in a consistent manner and to reduce the number of manual image ordering adjustments performed by the radiologist.

Typically, on a workstation such as a PACS workstation, an appropriate hanging protocol is automatically applied based on the characteristics of the study being loaded. Most PACS workstations allow hanging protocols to be customized by each individual user. To make it possible to share hanging protocol among workstations from different vendors, the DICOM specification has defined a Hanging Protocol Service Class and a Hanging Protocol Composite Information Object Definition (IOD).

Thus, in one example embodiment, the automatic visualization of best ES and ED frames are determined in advance using a hanging protocol. The hanging protocol is used to set the desired display for the user for each examination type, such that when loading the patient examination, the screen will automatically present the desired frames needed for the diagnostic procedure.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of one or more embodiments of the invention. The embodiments were chosen and described in order to best explain the principles and the practical application, and to enable others of ordinary skill in the art to practice and understand the one or more embodiments of the invention including making and using any devices or systems and performing any incorporated methods or various embodiments with various modifications as are suited to the particular use contemplated.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A computer-implemented method of determining optimal candidate frames for diagnosis from a sequence of coronary angiogram frames, said method comprising:

analyzing, on a computer, a motion of visible arteries in each frame including calculating a wavelet transform, summing resulting wavelet transform coefficients for each said angiogram frame and removing from consideration those angiogram frames whose corresponding wavelet transform coefficient sum is below a threshold;

measuring, on said computer, a movement of said visible arteries over time; and identifying, on said computer, those angiogram frames exhibiting minimal movement and selecting optimal candidate frames for diagnosis therefrom.

2. The method according to claim 1, wherein measuring a movement of said visible arteries over time comprises calculating differences between pairs of sequential angiogram frames.

3. The method according to claim 2, wherein calculating the difference between sequential angiogram frames comprises summing the square of the wavelet transform coefficient differences of all pixels in each pair of sequential angiogram frames.

4. The method according to claim 1, further comprising displaying said optimal candidate frames on a workstation display utilizing a hanging protocol.

5. A computer-implemented method of detecting optimal end systole (ES) and end diastole (ED) frames for diagnosis from a sequence of coronary angiogram frames, said method comprising:

determining, on a computer, a subset of frames with sufficient visible arteries for consideration from said sequence of coronary angiogram frames;

quantifying, on said computer, a movement of said visible arteries over time by calculating differences between pairs of sequential frames within said subset of frames;

identifying, on said computer, local minima frames based on said calculated differences; and selecting, on said computer, a pair of local minima frames for diagnosis corresponding to ES and ED frames of the same cardiac cycle.

6. The method according to claim 5, wherein determining a set of frames with sufficient visible arteries for consideration comprises:

for each said angiogram frame in said sequence, calculating a wavelet transform and summing resulting wavelet transform coefficients; and removing from consideration those angiogram frames whose corresponding wavelet transform coefficient sum is below a threshold.

7. The method according to claim 5, wherein calculating the differences between pairs of sequential frames comprises summing the square of the wavelet transform coefficient differences of all pixels of each pair of sequential angiogram frames in said subset.

8. The method according to claim 5, wherein identifying local minimum frames comprises finding all frames corresponding to local minima of $\beta/\alpha$ values, wherein $\beta$ represents the difference amplitude between sequential pairs of frames and $\alpha$ represents the sum of wavelet transform coefficients for each frame.

9. The method according to claim 5, wherein said ES and ED frames correspond to the lowest local minima frames from among all expected ranges of frames.

10. The method according to claim 9, wherein each expected range of frames comprises the duration of a single cardiac cycle minus two frames.

11. The method according to claim 5, further comprising selecting the higher intensity frame of said selected pair of local minimum frames as the ED frame and the lower intensity frame of said selected pair of local minimum frames as the ES frame.

12. The method according to claim 5, further comprising performing said steps of determining, quantifying and identifying on a plurality of sequences of coronary angiogram frames and selecting a best pair of local minima frames for diagnosis therefrom.

13. The method according to claim 5, further comprising utilizing a hanging protocol to display said ES and ED frames on a workstation display.

14. A computer-implemented method of detecting optimal end systole (ES) and end diastole (ED) frames for diagnosis from a sequence of coronary angiogram frames, said method comprising:

performing, on a computer, a wavelet transform on each frame within said sequence of angiogram frames and generating corresponding wavelet coefficients therefrom;

calculating, on said computer, for each frame within said sequence of angiogram frames, a sum of wavelet coefficients corresponding thereto;

generating, on said computer, a subset of frames from said sequence whose corresponding wavelet coefficient sum exceeds a threshold;

calculating, on said computer, differences between pairs of sequential frames in said subset of frames; and selecting, on said computer, based on said calculated differences, optimal ES and ED frames for diagnosis corresponding to the lowest pair of local minima from among all cardiac cycles within said subset of frames.

15. The method according to claim 14, wherein said threshold is set to a percentage of the range of values of said wavelet coefficient sums.

16. The method according to claim 14, wherein the wavelet coefficient sum for each frame comprises the square root of the sum of the squares of the wavelet coefficients of the corresponding frame.

17. The method according to claim 14, wherein calculating the differences between pairs of sequential frames comprises summing the square of the wavelet transform coefficient differences of all pixels of each pair of sequential angiogram frames in said subset.

18. The method according to claim 14, wherein selecting optimal ES and ED frames comprises finding all frames corresponding to local minima of $\beta/\alpha$ values, wherein $\beta$ represents the difference amplitude between sequential pairs of frames and $\alpha$ represents the sum of wavelet transform coefficients for each frame.

19. The method according to claim 14, further comprising selecting the higher intensity frame of said lowest pair of local minima frames as the ED frame and the lower intensity frame from said lowest pair of local minima frames as the ES frame.

20. The method according to claim 14, further comprising performing said method of detection on a plurality of sequences of coronary angiogram frames and selecting optimal ES and ED frames for diagnosis therefrom.

21. The method according to claim 14, further comprising utilizing a hanging protocol to display said optimal ES and ED frames on a workstation display.

22. A computer program product characterized by that upon loading it into computer memory a process of detecting optimal end systole (ES) and end diastole (ED) frames for diagnosis from a sequence of coronary angiogram frames is executed, the computer program product comprising:

a tangible, non-transitory computer usable medium having computer usable program code embodied therewith, the computer usable program code comprising:

computer usable code configured to determine a subset of frames with sufficient visible arteries for consideration from said sequence of coronary angiogram frames;

computer usable code configured to quantify a movement of said visible arteries over time by calculating differences between pairs of sequential frames within said subset of frames;

computer usable code configured to identify local minima frames based on said calculated differences; and computer usable code configured to select a pair of local minima frames for diagnosis corresponding to ES and ED frames of the same cardiac cycle.

23. A computer for use in performing quantitative coronary analysis (QCA), comprising:

a display;

a memory;

a processor coupled to execute instructions loaded into said memory, said instructions when executed on said processor operative to:

perform a wavelet transform on each frame within said sequence of angiogram frames and generate corresponding wavelet coefficients therefrom;

calculate, for each frame within said sequence of angiogram frames, a sum of wavelet coefficients corresponding thereto;

generate a subset of frames from said sequence whose corresponding wavelet coefficient sum exceeds a threshold;

calculate differences between pairs of sequential frames in said subset of frames; and select, based on said calculated differences, optimal ES and ED frames for diagnosis corresponding to the lowest pair of local minima from among all cardiac cycles within said subset of frames.

24. The computer according to claim 23, said processor further operative to display said optimal ES and ED frames on said display utilizing a hanging protocol.

* * * * *